United States Patent
Shin et al.

(10) Patent No.: US 12,297,370 B2
(45) Date of Patent: May 13, 2025

(54) UNDERCOAT PAINT COMPOSITION

(71) Applicant: KCC Corporation, Seoul (KR)

(72) Inventors: Se Jun Shin, Busan (KR); Sang Hyeak Yoon, Seoul (KR); Soon Jong Park, Ulsan (KR); Chi Uk Kim, Ulsan (KR); Jong Yun Park, Ulsan (KR); Dong Geon Kim, Ulsan (KR); Ick Jae Cho, Ulsan (KR); Hyuk Jeong, Seoul (KR)

(73) Assignee: KCC Corporation, Seoul (KR)

( * ) Notice: Subject to any disclaimer, the term of this patent is extended or adjusted under 35 U.S.C. 154(b) by 676 days.

(21) Appl. No.: 17/615,458

(22) PCT Filed: Apr. 9, 2020

(86) PCT No.: PCT/KR2020/004797
§ 371 (c)(1),
(2) Date: Nov. 30, 2021

(87) PCT Pub. No.: WO2020/251153
PCT Pub. Date: Dec. 17, 2020

(65) Prior Publication Data
US 2022/0228021 A1    Jul. 21, 2022

(30) Foreign Application Priority Data

Jun. 14, 2019 (KR) .................... 10-2019-0070821
Aug. 22, 2019 (KR) .................... 10-2019-0103160

(51) Int. Cl.
| | | |
|---|---|---|
| C09D 167/02 | (2006.01) | |
| C08G 63/00 | (2006.01) | |
| C08G 63/183 | (2006.01) | |
| C08G 63/20 | (2006.01) | |
| C08G 63/91 | (2006.01) | |
| C08K 3/04 | (2006.01) | |
| C08K 3/22 | (2006.01) | |
| C08K 3/34 | (2006.01) | |
| C09D 7/61 | (2018.01) | |

(52) U.S. Cl.
CPC ......... *C09D 167/02* (2013.01); *C08G 63/183* (2013.01); *C08G 63/20* (2013.01); *C08G 63/916* (2013.01); *C08K 3/04* (2013.01); *C08K 3/22* (2013.01); *C08K 3/34* (2013.01); *C09D 7/61* (2018.01); *C08K 2003/2241* (2013.01); *C08K 2003/343* (2013.01)

(58) Field of Classification Search
CPC ...... C08G 63/00; C08G 63/16; C08G 63/181; C08G 63/183; C08G 2150/00; C09D 167/02; C09D 167/08; C09D 5/4423; C09D 7/20

See application file for complete search history.

(56) References Cited

U.S. PATENT DOCUMENTS

| | | | | |
|---|---|---|---|---|
| 4,450,257 A | * | 5/1984 | Behmel | C09D 167/00 525/437 |
| 4,525,511 A | | 6/1985 | Kirby et al. | |
| 4,578,436 A | * | 3/1986 | Umemoto | C08G 63/48 525/428 |
| 4,609,706 A | * | 9/1986 | Bode | C08G 18/4288 525/278 |
| 4,891,419 A | * | 1/1990 | Takagawa | C09D 167/00 525/437 |
| 5,039,740 A | * | 8/1991 | Anderson | C09D 167/08 525/7.1 |
| 5,576,397 A | * | 11/1996 | Oberressl | C08G 63/60 525/437 |
| 5,859,154 A | * | 1/1999 | Temple | C08G 63/6928 528/307 |
| 9,416,295 B2 | * | 8/2016 | Tennebroek | C08G 18/606 |
| 10,280,332 B2 | * | 5/2019 | Moussa | B05D 3/0236 |
| 10,442,889 B2 | * | 10/2019 | Lock | C09D 167/00 |
| 10,508,214 B2 | * | 12/2019 | Takagi | B65D 25/14 |
| 2012/0301647 A1 | | 11/2012 | Moussa et al. | |
| 2014/0107272 A1 | | 4/2014 | Sung et al. | |
| 2015/0125643 A1 | | 5/2015 | Takagi et al. | |
| 2017/0081549 A1 | | 3/2017 | Moussa et al. | |
| 2017/0335060 A1 | | 11/2017 | Lock et al. | |

FOREIGN PATENT DOCUMENTS

| | | | | |
|---|---|---|---|---|
| CN | 102010648 A | * | 4/2011 | |
| CN | 102766398 A | * | 11/2012 | |
| CN | 103619718 A | | 3/2014 | |
| CN | 104379687 A | | 2/2015 | |
| CN | 107109108 A | | 8/2017 | |
| EP | 0008419 A1 | * | 3/1980 | |
| EP | 2243808 A1 | * | 10/2010 | ........... C09D 167/08 |
| JP | 2003-213201 A | | 7/2003 | |
| JP | 2007-297648 A | | 11/2007 | |
| KR | 10-0880461 B1 | | 1/2009 | |
| KR | 10-0918939 B1 | | 9/2009 | |
| KR | 10-1463179 B1 | | 11/2014 | |

(Continued)

OTHER PUBLICATIONS

Office Action issued in related Chinese Patent Application No. 202080043167.X dated Feb. 25, 2022.
International Search Report issued in corresponding International Patent Application No. PCT/KR2020/004797 dated Jul. 17, 2020.

*Primary Examiner* — Rip A Lee

(74) *Attorney, Agent, or Firm* — Morgan, Lewis & Bockius LLP

(57) ABSTRACT

The present invention relates to an undercoat paint composition comprising an acid-modified polyester resin, a pigment, and a solvent.

20 Claims, No Drawings

(56) References Cited

FOREIGN PATENT DOCUMENTS

| | | | |
|---|---|---|---|
| KR | 10-2015-0016950 A | 2/2015 | |
| KR | 10-2017-0042777 A | 4/2017 | |
| KR | 10-2017-0118677 A | 10/2017 | |
| KR | 10-2017-0132555 A | 12/2017 | |
| WO | WO-8909244 A1 * | 10/1989 | |
| WO | WO-2009121885 A1 * | 10/2009 | ........... C09D 167/08 |
| WO | WO-2009156457 A1 * | 12/2009 | ............. C08G 63/20 |

* cited by examiner

UNDERCOAT PAINT COMPOSITION

TECHNICAL FIELD

The present invention relates to an undercoat paint composition (referred also as a primer coating composition) to be coated on a trivalent chromium-plated surface.

BACKGROUND ART

Typically, automotive parts are plated with hexavalent chromium to impart a beautiful appearance. However, hexavalent chromium is susceptible to corrosion due to snow removal salt, so that there is a problem in that the appearance of parts plated with hexavalent chromium is discolored due to the snow removal salt. Therefore, in the automotive parts industry, plastic materials are plated using trivalent chromium instead of hexavalent chromium. The trivalent chromium plating is superior to the hexavalent chromium plating in physical properties against snow removal salt, for example, appearance stability, and may implement a luxurious and dark mirror image in automotive parts. In order to protect a trivalent chromium-plated surface and further improve the appearance of the surface, it is common to coat a coating material on a surface to be plated.

However, the trivalent chromium-plated surface has poor adhesiveness to a coating film when a typical undercoat paint coating for a hexavalent chromium-plated surface is applied, and physical properties such as water resistance, weather resistance, compatibility with high-pressure car washing, chipping resistance, and the like of the coating film are also poor. Accordingly, there is a demand for the development of an undercoat paint capable of forming a coating film having excellent physical properties such as adhesiveness, water resistance, weather resistance, compatibility with high-pressure car washing, and chipping resistance when coated on a trivalent chromium-plated surface.

Specifically, Korean Patent No. 1,463,179 (Patent Document 1) discloses a two-component paint composition, which is applied to a chromium-plated surface one time, and which includes a polyol resin, a coloring pigment, an extender pigment, a leveling agent, a reaction accelerator, an ultraviolet absorber, an ultraviolet stabilizer, and a solvent. However, the paint composition of Patent Document 1 has a limitation in that the water resistance of a manufactured coating film is poor.

Therefore, there is a need for the research and development of an undercoat paint composition capable of forming a coating film excellent in various physical properties such as adhesiveness, water resistance, weather resistance, compatibility with high-pressure car washing, chipping resistance, and the like when coated on a trivalent chromium-plated surface.

DISCLOSURE OF THE INVENTION

Technical Problem

Therefore, the present invention provides an undercoat paint composition capable of forming a coating film excellent in various physical properties such as adhesiveness, water resistance, weather resistance, compatibility with high-pressure car washing, chipping resistance, and the like when coated on a trivalent chromium-plated surface.

Technical Solution

The present invention provides an undercoat paint composition including an acid-modified polyester-based resin, a pigment, and a solvent.

Advantageous Effects

A trivalent chromium-plated surface has very low surface roughness, and thus, has a limitation in that the adhesiveness thereof to a coating film is significantly insufficient. Meanwhile, when an undercoat paint composition according to the present invention is coated on a trivalent chromium-plated surface, an acid-modified polyester-based resin in the undercoat paint composition corrodes the plated surface, thereby increasing the specific surface area of the plated surface, and due to the increase in the specific surface area, the adhesiveness between a manufactured coating film and the plated surface is increased, so that a coating film excellent in various physical properties such as water resistance, weather resistance, high pressure washing resistance, chipping resistance, and the like may be formed. Accordingly, the undercoat paint composition according to the present invention may be usefully used for painting automotive parts (e.g., radiator grills, door handles, steering wheels, center fascias, gearboxes, etc.) plated with a trivalent chromium.

BEST MODE FOR CARRYING OUT THE INVENTION

Hereinafter, the present invention will be described in detail.

The "number average molecular weight (Mn)" used herein is measured by a typical method known in the art, and may be measured by, for example, a gel permeation chromatograph (GPC) method. Furthermore, the "glass transition temperature (Tg)" is measured by a typical method known in the art, and may be measured by, for example, differential scanning calorimetry (DSC). In addition, a functional group value such as an "acid value (Av)" and a "hydroxyl value" may be measured by a method well known in the art, and may represent a value measured by, for example, titration.

In addition, the term "parts by weight" used herein means a weight ratio between raw material components.

Undercoat Paint Composition

An undercoat paint composition according to the present invention includes an acid-modified polyester-based resin, a pigment, and a solvent.

Acid-Modified Polyester-Based Resin

The acid-modified polyester-based resin serves to increase the adhesiveness, compatibility with high-pressure car washing, chipping resistance, and the like of a coating film.

The acid-modified polyester-based resin may be a polyester-based resin modified with one or more acids selected from the group consisting of an organic acid and an inorganic acid. Specifically, the acid-modified polyester-based resin may be a polyester-based resin modified with an inorganic acid.

In addition, the inorganic acid may include, for example, one or more selected from the group consisting of a sulfuric acid, a nitric acid, a phosphoric acid, and a carbonic acid. Specifically, the inorganic acid may include, for example, one or more selected from the group consisting of a sulfuric acid, a nitric acid, and a phosphoric acid.

The organic acid may include, for example, one or more selected from the group consisting of a formic acid, an acetic acid, an oxalic acid, and a fatty acid. Specifically, the organic acid may be a formic acid, an acetic acid, an oxalic acid, or a fatty acid having 1 to 2 carbon atoms.

In addition, the acid-modified polyester-based resin may be prepared by reacting a polyfunctional alcohol and an acid compound, and then modifying with an acid. For example, the acid-modified polyester-based resin may be prepared by performing a reaction such that the equivalent ratio between a hydroxyl group of a polyfunctional alcohol and a carboxyl group of an acid compound is 1.02:1 to 1.10:1, and then modifying with an acid. At this time, the reaction may be performed at 200 to 250° C., or 210 to 230° C.

The acid content of the acid-modified polyester-based resin may be 1 to 5 parts by weight, or 1.5 to 3.7 parts by weight based on 100 parts by weight of the acid-modified polyester-based resin. When the acid content of the acid-modified polyester-based resin is out of the above range, the adhesiveness and water resistance of a coating film are degraded and the polymerization of the resin does not occur, so that there may be a problem with the overall physical properties of a paint, particularly color discoloration.

In addition, the polyfunctional alcohol may include, for example, 2 to 4 hydroxyl groups. For example, the polyfunctional alcohol may include one or more selected from the group consisting of neopentylglycol, trimethylolpropane, ethyleneglycol, pentaerythritol, hexanediol, butylethylpropanediol (BEPD), and cyclohexanedimethanol (CHDM). In addition, the acid compound may include, for example, one or more selected from the group consisting of maleic anhydride, isophthalic acid, terephthalic acid, hexahydrophthalic acid, cyclohexanedicarboxylic acid (CHDA), and adipic acid.

The acid-modified polyester-based resin may have an acid value (Av) of 5 to 30 mgKOH/g, or 10 to 20 mgKOH/g. When the acid value of the acid-modified polyester-based resin is out of the above range, a curing reaction of the composition is delayed, so that the hardness and appearance of a coating film may be degraded.

In addition, the acid-modified polyester-based resin may have a number average molecular weight (Mn) of 5,000 to 15,000 g/mol, or 7,000 to 12,000 g/mol. When the number average molecular weight of the acid-modified polyester resin is within the above range, there is an effect in that the chipping resistance of a manufactured coating film is excellent, and when out of the above range, the chipping resistance and water resistance of a manufactured coating film may be degraded, The acid-modified polyester-based resin may have a glass transition temperature (Tg) of 10 to 50° C., or 20 to 40° C. When the glass transition temperature of the acid-modified polyester-based resin is within the above range, the workability of the composition and the water resistance of a manufactured coating film may be improved, and when the glass transition temperature is out of the above range, the weather resistance of a manufactured coating film may be degraded.

In addition, the acid-modified polyester-based resin may have a viscosity of 100 to 3,000 cps, or 500 to 2,500 cps at 25° C. When the viscosity of the acid-modified polyester-based resin at 25° C. is within the above range, the adhesiveness and chipping resistance of a manufactured coating film may be improved, and when the viscosity is out of the above range, the chipping resistance of a manufactured coating film may be degraded.

The acid-modified polyester-based resin may be included in the composition in an amount of 40 to 55 parts by weight based on 3 to 25 parts by weight of the pigment. For example, the acid-modified polyester-based resin may be included in the composition in an amount of 45 to 53 parts by weight based on 3 to 25 parts by weight of the pigment. When the content of the acid-modified polyester-based resin is within the above range, the appearance, water resistance, heat cycle resistance, acid resistance, alkali resistance, and the like of a manufactured coating film are excellent.

Pigment

The pigment serves to impart a color or increase strength to a manufactured coating film.

The pigment may be, for example, a coloring pigment, an extender pigment, or a mixture thereof.

The coloring pigment serves to secure opacity, and impart a color to a coating film. At this time, the coloring pigment may be a black pigment, a white pigment, or a mixture thereof. The coloring pigment may include a pigment of blue, red, yellow, violet, or the like.

In addition, the coloring pigment may be included in the composition in an amount of 1 to 15 parts by weight, or 4 to 12 parts by weight based on 40 to 55 parts by weight of the acid-modified polyester-based resin. When the content of the coloring pigment is out of the above range, the opacity of a manufactured coating film may decrease or the economic feasibility of a paint may decrease.

At this time, as the black pigment, any black pigment typically known may be used without particular limitation, and for example, carbon black, graphite, an iron oxide, or a mixture thereof may be used.

In addition, the black pigment may be included in the composition in an amount of 0.1 to 5 parts by weight, or 0.5 to 3 parts by weight based on 40 to 55 parts by weight of the acid-modified polyester-based resin. When the content of the black pigment is less than 0.1 parts by weight, it may be difficult to impart a required color to a coating film, and when greater than 5 parts by weight, the appearance of the coating film may become poor, or since an effect to be achieved is not significant compared to an amount added, the economic feasibility of the undercoat paint composition may be degraded.

As the white pigment, any white pigment typically known may be used without particular limitation, and for example, a titanium dioxide or the like may be used.

In addition, the white pigment may be included in the composition in an amount of 1 to 10 parts by weight, or 4 to 9 parts by weight based on 40 to 55 parts by weight of the acid-modified polyester-based resin. When the content of the white pigment is less than 1 part by weight, it may be difficult to impart a required color to a coating film or the water resistance of the coating film may be degraded, and when greater than 10 parts by weight, the chipping resistance and compatibility with high-pressure car washing of the coating film may be degraded.

The extender pigment serves to increase the strength of a manufactured coating film. As the extender pigment, any component typically known as an extender pigment may be used without particular limitation, and for example, talc, calcium carbonate, barium sulfate, calcium silicate, silica, or a mixture thereof may be used.

In addition, the extender pigment may be included in the composition in an amount of 1 to 10 parts by weight, or 4 to 9 parts by weight based on 40 to 55 parts by weight of the acid-modified polyester-based resin. When the content of the extender pigment is less than 1 part by weight, the strength of a coating film may be degraded, and when greater than 10 parts by weight, the chipping resistance and compatibility with high-pressure car washing of the coating film may be degraded.

The pigment may be 3 to 25 parts by weight, or 9 to 20 parts by weight based on 40 to 55 parts by weight of the acid-modified polyester-based resin. When the content of the pigment is less than 3 parts by weight, the appearance of a coating film may become poor or the strength thereof may be degraded, and when greater than 25 parts by weight, the chipping resistance and compatibility with high-pressure car washing of the coating film may be degraded.

Solvent

The solvent serves to increase the viscosity and dispersibility of the undercoat paint composition and to secure workability. At this time, the solvent may be, for example, an aromatic hydrocarbon-based solvent or an ether-based solvent.

The aromatic hydrocarbon-based solvent may be, for example, xylene, toluene, or a mixture thereof. In addition, examples of a commercially available product of the aromatic hydrocarbon-based solvent may include KOCOSOL #100, KOCOSOL #150, and the like.

In addition, the ether-based solvent may be, for example, di-n-butyl ether, di-isobutyl ether, di-sec-butyl ether, di-n-pentyl ether, diisopentyl ether, di-sec-pentyl ether, di-tert-amyl ether, di-n-hexyl ether, methyl cyclopentyl ether, methyl cyclohexyl ether, methyl phenyl ether, methyl benzyl ether, ethyl cyclopentyl ether, ethyl cyclohexyl ether, ethyl phenyl ether, ethyl benzyl ether, or a mixture thereof.

The solvent may be included in the composition in an amount of 25 to 40 parts by weight, or 30 to 38 parts by weight based on 40 to 55 parts by weight of the acid-modified polyester-based resin. When the content of the solvent is less than 25 parts by weight, it may be difficult to control the viscosity of the undercoat paint composition or the dispersibility thereof may be degraded, and when greater than 40 parts by weight, the appearance of a coating film may become poor or the formation of the coating film may take a long time.

Additive

The undercoat paint composition according to the present invention may further include one or more additives selected from the group consisting of a dispersing agent, a thickener, and a curing accelerator.

At this time, the dispersing agent serves to increase the dispersibility of the undercoat paint composition. As the dispersing agent, any component typically known as a dispersing agent may be used without particular limitation, and for example, a modified polyurethane, a polycarboxylic acid polyester, an alkyl ammonium salt compound, an acrylic compound, a polyester-based compound, or a mixture thereof may be used.

The dispersing agent may be included in the composition in an amount of 0.1 to 2 parts by weight, or 1 to 2 parts by weight based on 40 to 55 parts by weight of the acid-modified polyester-based resin. When the content of the dispersing agent is less than 0.1 parts by weight, the dispersibility of the undercoat paint composition may be degraded, and when greater 2 parts by weight, the compatibility with high-pressure car washing and chipping resistance of a coating film may be degraded.

The thickener serves to control the viscosity of the undercoat paint composition. As the thickener, any component typically known as a thickener may be used without particular limitation, and for example, fumed silica, organo clay, silica, wax, urea, or a mixture thereof may be used.

The thickener may be included in the composition in an amount of 0.1 to 2 parts by weight, or 1 to 2 parts by weight based on 40 to 55 parts by weight of the acid-modified polyester-based resin. When the content of the thickener is less than 0.1 parts by weight, it may be difficult to control the viscosity of the undercoat paint composition, and when greater than 2 parts by weight, due to the high viscosity of the undercoat paint composition, coating workability may be degraded or the appearance of a manufactured coating film may become poor.

The curing accelerator serves to increase curing reactivity of the undercoat paint composition. As the curing accelerator, any component typically known as a curing accelerator may be used without particular limitation, and for example, dibutyltin dilaurate, dioctyltin dilaurate, dibutyltin bis (acetylacetonate), dibutyltin oxide, dibutyltin maleate, dibutyltin octoate, dibutyltin dimaleate, or a mixture thereof may be used.

In addition, the curing accelerator may be included in the composition in an amount of 0.1 to 5 parts by weight, or 1 to 3 parts by weight based on 40 to 55 parts by weight of the acid-modified polyester-based resin. When the content of the curing accelerator is less than 0.1 parts by weight, it may be difficult to obtain an effect of increasing the curing reactivity, and when greater than 5 parts by weight, the curing reactivity may be excessively increased to make it difficult to secure coating workability and pot life.

Curing Agent Part

The undercoat paint composition according to the present invention may include, in addition to the undercoat main part described above, an undercoat curing agent part to be described below.

The undercoat curing agent part may include an isocyanate resin. At this time, the undercoat curing agent part serves to cure the undercoat paint composition by being subjected to a crosslinking reaction with components in the undercoat main part. Specifically, the undercoat curing agent part may cure the undercoat paint composition by reacting an isocyanate group of the isocyanate resin with a hydroxyl group of the components in the undercoat main part, thereby forming a urethane bond.

In addition, as the isocyanate resin, any typical isocyanate resin which may be used as a curing agent for a paint may be used without particular limitation. For example, the isocyanate resin may be a hexamethylene diisocyanate (HMDI)-based one having excellent yellowing resistance and weather resistance, for example, an HMDI biuret type.

The undercoat paint composition may include the undercoat main part and the undercoat curing agent part in a weight ratio of 10 to 25:1, or a weight ratio of 15 to 20:1.

The undercoat composition according to the present invention as described above may form a coating film excellent in various physical properties such as adhesiveness, water resistance, weather resistance, compatibility with high-pressure car washing, chipping resistance, and the like when coated on a trivalent chromium-plated surface. Accordingly, the undercoat paint composition according to the present invention may be usefully used for painting automotive parts (e.g., radiator grills, door handles, steering wheels, center fascias, gearboxes, etc.) plated with a trivalent chromium.

MODE FOR CARRYING OUT THE INVENTION

Hereinafter, the present invention will be described in more detail with reference to examples. However, the following examples are merely illustrative of the present invention and are not intended to limit the scope of the present invention.

Preparation Examples 1 to 7. Preparation of Acid-Modified Polyester-Based Resin

A step 1 monomer disclosed in Table 1 was put into a four-neck round flask, and a nitrogen gas pipe, a packed column, an H-type separation pipe, a stirrer, a thermometer, and a heater were installed. Thereafter, the temperature was raised to 230° C. at a rate of 20° C. per hour, and then the raised temperature was maintained for 3 hours to obtain an intermediate reactant. Thereafter, the intermediate reactant was added with a reflux solvent xylene (XL), and then refluxed at 230° C. to increase the molecular weight of the intermediate reactant. During the reaction, a step 2 monomer was introduced and reacted, and then cooled to room temperature, and the mixture was added with toluene and cyclohexanone in a weight ratio of 50:50 and diluted to a viscosity of 900 cps at 25° C. to obtain a polyester resin.

col (35 g), neopentylglycol (30 g) butylethylpropanediol (290 g) hexanediol (35 g), terephthalic acid (140 g), isophthalic acid (90 g), phthalic anhydride (40 g), adipic acid (160 g), and a tin catalyst (0.5 g) were used as raw materials, and phosphoric acid was not introduced during the reaction.

The prepared polyester resin had an acid value (Av) of 5 mgKOH/g, a number average molecular weight (Mn) of 8,500 g/mol, and a glass transition temperature (Tg) of 25° C.

Examples 1 to 11 and Comparative Examples 1 to 4. Preparation of Undercoat Main Part Using the content for each component disclosed in Tables 2 and 3, a polyester resin, a white pigment, a black pigment, an extender pigment, a dispersing agent, and a thickener were placed in a container and mixed at a low speed using a stirrer. Thereafter, dispersion was performed using a ring mill disperser until a dispersion particle size of 20 μm was

TABLE 1

| | | Preparation Examples | | | | | | |
|---|---|---|---|---|---|---|---|---|
| | (Parts by weight) | 1 | 2 | 3 | 4 | 5 | 6 | 7 |
| Step 1 | Ethyleneglycol | 70 | — | 70 | 71 | 44 | 44 | 70 |
| | Neopentylglycol | 210 | 110 | 210 | 112 | — | 62 | 230 |
| | Methylpropanediol | — | 160 | — | — | 96 | 97 | — |
| | Pentaerythritol | — | 20 | — | 5 | — | — | — |
| | Butylethylpropanol | — | 50 | — | — | — | — | — |
| | Hexanediol | 20 | — | 20 | — | 70 | — | 20 |
| | Isophthalic acid | — | — | — | 144 | 148 | 75 | — |
| | Terephthalic acid | 160 | — | 160 | 108 | 74 | 150 | 160 |
| | Phthalic anhydride | 140 | 360 | 140 | — | — | 133 | 140 |
| | Adipic acid | 190 | 40 | 190 | 95 | 130 | — | 190 |
| | Sebacic acid | — | 60 | — | — | — | — | — |
| | Tin catalyst | 0.5 | 0.5 | 0.5 | 0.5 | 0.5 | 0.5 | 0.5 |
| Step 2 | Phosphoric acid | 20 | 20 | — | — | 20 | 20 | 13 |
| | Sulfuric acid | — | — | 20 | — | — | — | — |
| | Nitric acid | — | — | — | 20 | — | — | — |
| Physical Properties | Acid value (mgKOH/g) | 15 | 15 | 15 | 15 | 10 | 20 | 11 |
| | Number average molecular weight (g/mol) | 8,000 | 8,500 | 8,500 | 8,000 | 7,000 | 12,000 | 7,500 |
| | Glass transition temperature (° C.) | 20 | 25 | 25 | 20 | 20 | 40 | 20 |

Preparation Example 8. Unmodified Polyester-Based Resin

An unmodified polyester-based resin ester was obtained in the same manner as in Example 1 except that ethyleneglycol achieved. Thereafter, when the dispersion particle size reached 20 μm, the mixture was transferred to another container, added with a curing accelerator, Solvent 1, and Solvent 2, and then stirred for 30 minutes to prepare an undercoat main part.

TABLE 2

| Components (Parts by weight) | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Preparation Example 1 | 48 | — | 52.5 | — | 24 | 42 | — | — | — | — | — |
| Preparation Example 2 | — | 48 | — | 43.5 | 24 | — | — | — | — | — | — |
| Preparation Example 3 | — | — | — | — | — | — | 48 | — | — | — | — |
| Preparation Example 4 | — | — | — | — | — | — | — | 48 | — | — | — |
| Preparation Example 5 | — | — | — | — | — | — | — | — | 48 | — | — |

TABLE 2-continued

| Components (Parts by weight) | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Preparation Example 6 | — | — | — | — | — | — | — | — | — | 48 | — |
| Preparation Example 7 | | | | | | | | | | | 48 |
| Black pigment | 1.5 | 1.5 | 1 | 2 | 1.5 | 2.5 | 1.5 | 1.5 | 1.5 | 1.5 | 1.5 |
| White pigment | 6.5 | 6.5 | 4.5 | 8.5 | 6.5 | 8.5 | 6.5 | 6.5 | 6.5 | 6.5 | 6.5 |
| Extender pigment | 6.5 | 6.5 | 4.5 | 8.5 | 6.5 | 6.5 | 6.5 | 6.5 | 6.5 | 6.5 | 6.5 |
| Dispersing agent | 1.5 | 1.5 | 1.5 | 1.5 | 1.5 | 2 | 1.5 | 1.5 | 1.5 | 1.5 | 1.5 |
| Thickener | 1.5 | 1.5 | 1.5 | 1.5 | 1.5 | 2 | 1.5 | 1.5 | 1.5 | 1.5 | 1.5 |
| Curing accelerator | 1.5 | 1.5 | 1.5 | 1.5 | 1.5 | 1.5 | 1.5 | 1.5 | 1.5 | 1.5 | 1.5 |
| Solvent 1 | 28.5 | 28.5 | 28.5 | 28.5 | 28.5 | 28.5 | 28.5 | 28.5 | 28.5 | 28.5 | 28.5 |
| Solvent 2 | 4.5 | 4.5 | 4.5 | 4.5 | 4.5 | 6.5 | 4.5 | 4.5 | 4.5 | 4.5 | 4.5 |
| Total | 100 | 100 | 100 | 100 | 100 | 100 | 100 | 100 | 100 | 100 | 100 |

TABLE 3

| Components (parts by weight) | Comparative Examples | | | |
|---|---|---|---|---|
| | 1 | 2 | 3 | 4 |
| Preparation Example 1 | 37 | — | — | — |
| Preparation Example 3 | — | 57.5 | — | — |
| Preparation Example 4 | — | — | 37 | — |
| Preparation Example 8 | — | — | — | 48 |
| Black pigment | 1.5 | 0.5 | 1.5 | 1.5 |
| White pigment | 7 | 2 | 7 | 6.5 |
| Extender pigment | 17 | 2.5 | 17 | 6.5 |
| Dispersing agent | 1.5 | 1.5 | 1.5 | 1.5 |
| Thickener | 1.5 | 1.5 | 1.5 | 1.5 |
| Curing accelerator | 1.5 | 1.5 | 1.5 | 1.5 |
| Solvent 1 | 28.5 | 28.5 | 28.5 | 28.5 |
| Solvent 2 | 4.5 | 4.5 | 4.5 | 4.5 |
| Total | 100 | 100 | 100 | 100 |

Hereinafter, the manufacturer and product name, or component name of each component used in Comparative Examples and Examples are shown below.

Black pigment: carbon black
White pigment: titanium dioxide
Extender pigment: aluminum silicate
Dispersing agent: BYK-170 (product name), BYK-Chemie GmbH (manufacturer)
Thickener: synthetic silica (product name: AEROSIL R972, manufacturer: EVONIK)
Curing accelerator: dibutyltin dilaurate (DBTDL)
Solvent 1: Toluene
Solvent 2: xylene Experimental Example. Evaluation of Coating Film The undercoat main part prepared in each of Examples and Comparative Examples and a polyisocyanate-based curing agent (HDI Buiret type, manufacturer: COVESTRO, product name: ACU35541) were mixed in a weight ratio of 20:1 and then diluted with a thinner to manufacture an undercoat paint composition having a viscosity of a Ford cup #4 at 25° C. of 13 to 14 seconds.

Thereafter, the undercoat paint composition was coated (thickness of dried coating film: 10 to 14 μm) on a trivalent chromium-plated surface (an object to be plated: a radiator grill), and then dried at room temperature for 9 minutes to form an undercoat coating film.

Thereafter, a base paint (product name: UT5721(F)-1999, manufacturer: KCC) was coated on the undercoat coating film (thickness of dried coating film: 20 to 30 μm), and then dried at room temperature for 9 minutes to obtain a final coating film.

Thereafter, the physical properties of the undercoat coating film or the final coating film described above were evaluated in the following manner, and the results are shown in Table 4 below. At this time, excellent is denoted by ⊚, good is denoted by ○, average is denoted by Δ and poor is denoted by X.

(1) Appearance

The undercoat paint composition coated and dried at 70° C. for 30 minutes, and then the degree of air bubbles, foreign matters, spots, grooves, and orange peel on the surface were assessed with the naked eye. The test was repeated 6 times, and if the undercoat paint composition passed the test 6 times, it was evaluated as excellent, if passed 5 times, it was evaluated as good, if passed 3 or 4 times, it was evaluated as average, and when the undercoat paint composition passed less than 3 times, it was evaluated as poor. At this time, the conditions for passing the test were that there were no air bubbles, foreign matters, spots and grooves, and that there was no orange peel when observed with the naked eye.

(2) Adhesiveness

The adhesion of the final coating film was evaluated by counting the number of de-laminated portions out of 100 marks of a 1 mm×1 mm (width×length) size in accordance with the ASTM D3359 tape adhesiveness test method. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the condition for passing the test was that the adhesiveness was M2.5 or greater, which is the standard disclosed in ISO 2409.

(3) Water Resistance

The final coating film was deposited in a 40° C. constant temperature bath for 10 days, the adhesiveness evaluation and visual assessment of the final coating film were performed. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(4) Moisture Resistance

The final coating film was left to stand for 10 days under the conditions of 50±2° C. and a relative humidity of 95±2%, and then moisture was removed from the final coating film by air blow. Thereafter, the final coating film was left to stand at room temperature for 1 hour, and then the adhesiveness evaluation and visual assessment of the final coating film were performed. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(5) Heat Resistance

The final coating was left to stand in a 80° C. oven for 300 hours, and then the adhesiveness evaluation and visual assessment of the final coating film were performed. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(6) Heat Resistance Cycle Test

The final coating film was treated at 80±2° C. for 3 hours, treated at room temperature for 1 hour, treated at −40±2° C. for 3 hours, treated at room temperature for 1 hour, treated at 50±2° C. for 7 hours with a relative humidity of 95±2%, and then treated at room temperature for 1 hour, which was set to 1 cycle, and the final coating film was heat treated by repeating the cycle a total of 5 times, left to stand at room temperature for 1 hour, and then the adhesiveness evaluation and visual assessment of the final coating film were performed. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(7) Salt Spray Resistance

The final coating film was sprayed for 240 hours according to the spray conditions (35±2° C. and a relative humidity of 95%, spray volume: 0.5 to 3.0 ml/h, saline solution concentration: 5±1 w/v %, and saline solution pH: 6.5 to 7.2), washed with water, and then moisture was removed. Thereafter, the final coating film was left to stand at room temperature for 1 hour, and then the adhesiveness evaluation and visual assessment of the final coating film were performed. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(8) Acid Resistance 0.2 ml of a 0.1 N sulfuric acid aqueous solution was dropped on a surface of the final coating film, and then the final coating film was left to stand at room temperature for 24 hours, washed with water, followed by removing moisture from the surface by air blow. Thereafter, the final coating film was left to stand at room temperature for 1 hour, and then the appearance of the final coating film was observed to evaluate acid resistance. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the condition for passing the test was that a Grey scale (KSK 0910) was at Level 3 higher. At this time, the Grey scale determines the degree of contamination by levels, and Level 5 represents there is no contamination, Level 3 represents average, and Level 2 represents there is contamination.

(9) Alkali Resistance

The alkali resistance was evaluated in the same manner as in the above item (8), except that a 0.1 N sodium hydroxide aqueous solution was used instead of the sulfuric acid aqueous solution.

(10) Weather Resistance

The adhesiveness evaluation and visual assessment of the coating film were performed after exposing the coating film with an energy of 2500 kJ in a xenon weatherometer tester environment. The adhesiveness test was performed in the same manner as in the above item (2), and the visual assessment was performed by assessing the degree of swelling, cracking, and discoloration on the appearance of the coating film with the naked eye. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the conditions for passing the test were that the adhesiveness was M2.5 or greater and that there was no swelling, cracking, and discoloration on the appearance of the coating film when the visual assessment was performed.

(11) Compatibility with High-Pressure Car Washing

Using a high-pressure car wash tester, high-pressure water was sprayed onto the final coating film at a pressure of 70 kgf from a distance of 10 cm, and the degree of delamination of the final coating film was evaluated as in the same manner as in the above item (2). The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the condition for passing the test was that the adhesiveness was M.25 or greater.

(12) Chipping Resistance

At an angle of 45°, a pressure of 4.0 kgf and at room temperature, a 50 g stele was fired at the final coating film from a distance of 100 mm, and the degree of mark generation on the surface of the final coating film was evaluated. The test was repeated 6 times, and if passed the test 6 times, it was evaluated as excellent, if passed 5 times, it was evaluated as good, if passed 3 or 4 times, it was evaluated as average, and if passed less than 3 times, it was evaluated as poor. At this time, the condition for passing the test was that two or less marks of 2 mm or more were generated on the surface of the final coating film.

TABLE 4

| Component | Examples | | | | | | | | | | | Comparative Examples | | | |
|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 |
| Appearance | ◎ | ◎ | ◎ | ◎ | ◎ | ○ | ○ | ○ | ◎ | ◎ | ◎ | △ | △ | X | ○ |
| Adhesiveness | ◎ | ◎ | ◎ | ◎ | ◎ | ○ | ○ | ◎ | ◎ | ◎ | ○ | ○ | ○ | △ | X |
| Water resistance | ◎ | ◎ | ◎ | ○ | ◎ | ○ | ○ | ○ | ◎ | ◎ | ○ | △ | △ | X | X |
| Moisture resistance | ◎ | ◎ | ◎ | ◎ | ◎ | ○ | ○ | ◎ | ◎ | ◎ | ◎ | ○ | ○ | △ | X |
| Heat resistance | ◎ | ◎ | ◎ | ◎ | ◎ | ○ | ○ | ◎ | ◎ | ◎ | ◎ | ○ | ○ | △ | X |
| Heat cycle resistance | ◎ | ◎ | ◎ | ○ | ◎ | ○ | ○ | ○ | ◎ | ◎ | ○ | △ | △ | X | X |
| Salt spray resistance | ◎ | ◎ | ◎ | ◎ | ◎ | ○ | ○ | ◎ | ◎ | ◎ | ◎ | ○ | ○ | △ | X |
| Acid resistance | ◎ | ◎ | ◎ | ○ | ◎ | ○ | ○ | ○ | ◎ | ◎ | ◎ | △ | △ | X | ○ |
| Alkali resistance | ◎ | ◎ | ◎ | ○ | ◎ | ○ | ○ | ○ | ◎ | ◎ | ◎ | △ | △ | X | ○ |
| Weather resistance | ◎ | ◎ | ◎ | ◎ | ◎ | ○ | ○ | ◎ | ◎ | ◎ | ◎ | ○ | ○ | △ | X |
| Compatibility with high-pressure car washing | ◎ | ◎ | ◎ | ○ | ◎ | ○ | ○ | ○ | ◎ | ◎ | ◎ | ○ | ○ | △ | X |
| Chipping resistance | ◎ | ◎ | ◎ | ◎ | ◎ | ○ | ○ | ○ | ◎ | ◎ | ◎ | ○ | ○ | △ | ○ |

As shown in Table 4, it can be seen that the final coating film manufactured from each of the compositions of Examples 1 to 11 was excellent in all physical properties such as adhesiveness, moisture resistance, heat resistance, heat cycle resistance, salt spray resistance, acid resistance, alkali resistance, weather resistance, compatibility with high-pressure car washing, chipping resistance, and the like.

The invention claimed is:

1. An undercoat paint composition comprising an acid-modified polyester-based resin, a pigment, and a solvent,
   wherein the acid-modified polyester-based resin is a polyester-based resin modified with one or more acids selected from the group consisting of organic acids and inorganic acids, and
   the undercoat paint composition comprises 40 to 55 parts by weight of an acid-modified polyester-based resin, 3 to 25 parts by weight of a pigment, and 25 to 40 parts by weight of a solvent.

2. The undercoat paint composition of claim 1, wherein the acid-modified polyester-based resin has an acid value of 5 to 30 mgKOH/g, a number average molecular weight of 5,000 to 15,000 g/mol, and a glass transition temperature of 10 to 50° C.

3. The undercoat paint composition according to claim 1, wherein the acid-modified polyester-based resin is modified with an inorganic acid.

4. The undercoat paint composition according to claim 3, wherein the inorganic acid comprises one or more selected from the group consisting of a sulfuric acid, a nitric acid, a phosphoric acid, and a carbonic acid.

5. The undercoat paint composition according to claim 3, wherein the inorganic acid comprises one or more selected from the group consisting of a sulfuric acid, a nitric acid, and a phosphoric acid.

6. The undercoat paint composition according to claim 1, wherein the organic acid comprises one or more selected from the group consisting of a formic acid, an acetic acid, an oxalic acid, and a fatty acid.

7. The undercoat paint composition according to claim 1, wherein acid content of the acid-modified polyester-based resin is 1 to 5 parts by weight based on 100 parts by weight of the acid-modified polyester-based resin.

8. The undercoat paint composition according to claim 1, wherein acid content of the acid-modified polyester-based resin is 1.5 to 3.7 parts by weight based on 100 parts by weight of the acid-modified polyester-based resin.

9. The undercoat paint composition according to claim 1, wherein the acid-modified polyester-based resin has a number average molecular weight (Mn) of 5,000 to 15,000 g/mol.

10. The undercoat paint composition according to claim 1, wherein the acid-modified polyester-based resin has a number average molecular weight (Mn) of 7,000 to 12,000 g/mol.

11. The undercoat paint composition according to claim 1, wherein the acid-modified polyester-based resin has glass transition temperature (Tg) of 10 to 50° C.

12. The undercoat paint composition according to claim 1, wherein the acid-modified polyester-based resin has glass transition temperature (Tg) of 20 to 40° C.

13. The undercoat paint composition according to claim 1, wherein the acid-modified polyester-based resin has a viscosity of 100 to 3,000 cps at 25° C.

14. The undercoat paint composition according to claim 1, wherein the acid-modified polyester-based resin has a viscosity of 500 to 2,500 cps at 25° C.

15. The undercoat paint composition according to claim 1, wherein the acid-modified polyester-based resin is in the composition in an amount of 40 to 55 parts by weight based on 3 to 25 parts by weight of the pigment.

16. The undercoat paint composition according to claim 1, wherein the pigment comprises one or more selected from the group consisting of a black pigment, a white pigment, a blue pigment, a red pigment, a yellow pigment, and a violet pigment.

17. The undercoat paint composition according to claim 1, wherein the pigment comprises a black pigment selected from the group consisting of carbon black, graphite, and iron oxide.

18. The undercoat paint composition according to claim 1, wherein the pigment comprises titanium dioxide.

19. The undercoat paint composition according to claim 1, wherein the solvent comprises an aromatic hydrocarbon-based solvent or an ether-based solvent.

20. The undercoat paint composition according to claim 1, wherein the composition further comprises an additive selected rom the group consisting of a dispersing agent, a thickener, and a curing accelerator.

* * * * *